W. BELLIS.
Shaft-Hangers.
No. 138,119. Patented April 22, 1873.
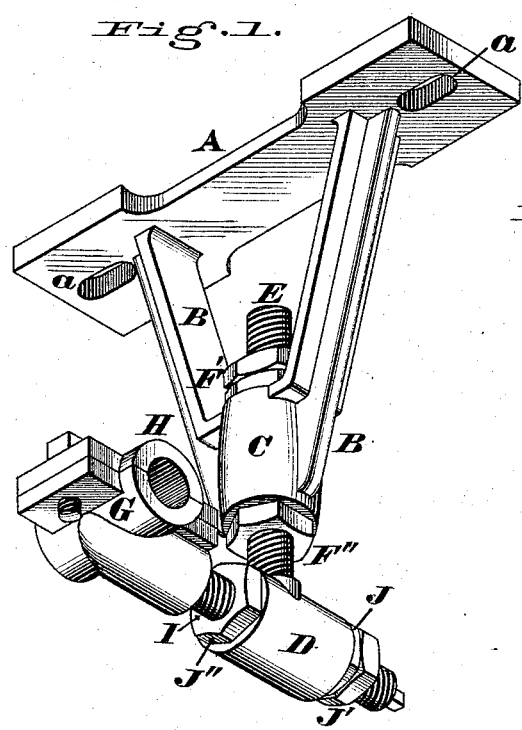
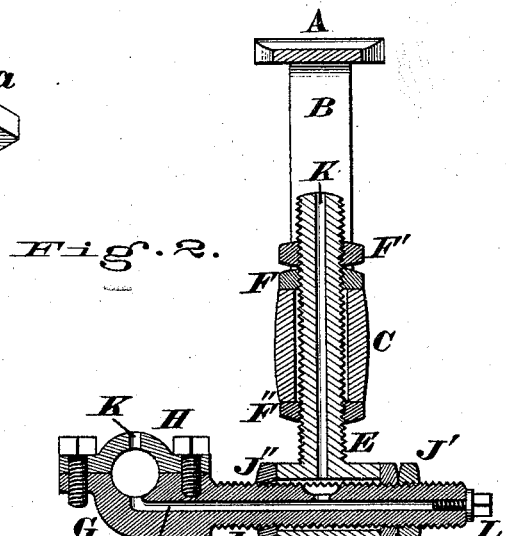
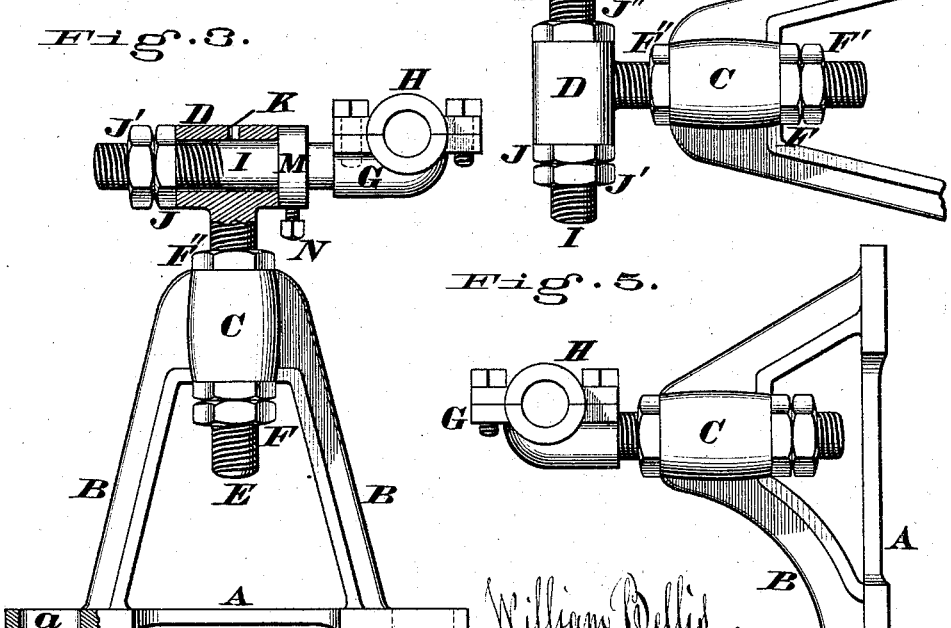
Attest.
Jas. H. Layman.
Walter Allen.
William Bellis
By Knight Bros.
Att'ys.

UNITED STATES PATENT OFFICE.

WILLIAM BELLIS, OF INDIANAPOLIS, INDIANA.

IMPROVEMENT IN SHAFT-HANGERS.

Specification forming part of Letters Patent No. 138,119, dated April 22, 1873; application filed April 2, 1873.

*To all whom it may concern:*

Be it known that I, WILLIAM BELLIS, of Indianapolis, Marion county, Indiana, have invented a new and useful Shaft-Bearing, of which the following is a specification:

Nature and Object of the Invention.

My invention is designed to secure a perfectly self-adjusting bearing for shafting, and consists essentially of a bracket, stand, or hanger, having a socket for the reception of a screw-threaded shank terminating in a loop that, in turn, receives the similarly screw-threaded shank of a journal-box which constitutes the bearing proper. Both screw-threaded shanks named are provided with principal and jam-nuts, to hold them to any specific position while permitting them to turn or swivel freely in their sockets in conformity with any angular deflection of the shaft.

Specific Description.

Figure 1 is a perspective view of a bearing embodying my invention in the form of a hanger. Fig. 2 is a vertical section of the same. Fig. 3 is a partially-sectionized side elevation of a stand or pedestal with my improvement. Figs. 4 and 5 are side elevations of wall or post hangers or brackets on my plan.

My bearing proper is attached to ceiling, wall, or floor, by suitable cast-hanger, bracket, or stand, which may consist of a base, A, web B, and cylindrical loop or socket C, which socket has accurately-squared ends. The base is pierced by slots *a* to receive the bolts which fasten the said casting to the wall, post, floor, or ceiling. D is a cylindrical loop or socket, from whose side projects, at right angles, a screw-threaded shank, E, which, having been inserted in the socket C, is adjusted and held to any specific elevation by the adjusting-nuts F F' and jam-nuts F''. The ends of said loop are truly faced or squared. G and H are, respectively, the box and cap or lower and upper members of a shaft journal-bearing. Projecting rectangularly from said box is a screw-threaded shank, I, which, having been inserted in loop D, is secured to any desired horizontal adjustment by means of adjusting-nuts J J' and jam-nut J''. Each socket or bearing is preferably provided with an oil-duct, K, which may, when necessary, be closed by a plug, L, or be furnished with any approved form of oiler.

I have shown the form of hanger or bracket actually employed by me, but it is evident that any suitable support or means of attachment may be used.

A shaft thus supported can be adjusted vertically without horizontal disturbance, or can be adjusted horizontally without disturbing its altitude; or, by both of these adjustments, it may be shifted in any oblique direction; and, should it sag or otherwise get out of line, it will not bind or cut in its bearings, because the latter are capable of readily conforming to any angular position that the shaft may assume.

The box or bearing proper, being located on one side of the point of suspension, the shaft can be at any time easily removed or replaced, or can be temporarily supported while the bearing is being removed for cleansing, substitution, or repair.

If preferred the inner nuts F'' J'' may be dispensed with and a shiftable collar, M, substituted for them, said collar being maintained securely in position by a set-screw, N, as shown in Fig. 3.

Claim.

I claim as new and of my invention—

The described adjustable or yielding shaft-bearing, comprising the following essential parts—to wit: Cylindrical socket C holding screw-threaded shank E of loop D, which in turn holds screw-threaded shank I of bearing G H, said shanks having suitable jam and principal nuts or their equivalents, as and for the purpose set forth.

In testimony of which invention I hereunto set my hand.

WILLIAM BELLIS.

Attest:
 GEO. H. KNIGHT,
 SAMUEL STEPHENS,
 RALPH TOUSEY.